E. WINDSOR-BOWEN.
APPARATUS FOR SUPPLYING FUEL TO INTERNAL COMBUSTION ENGINES.
APPLICATION FILED AUG. 12, 1919.

1,362,211.

Patented Dec. 14, 1920.
3 SHEETS—SHEET 1.

UNITED STATES PATENT OFFICE.

ERNEST WINDSOR-BOWEN, OF SURREY, ENGLAND, ASSIGNOR OF THIRTY-FIVE PER CENT. TO THOMAS LEWIS DAVIES, OF LONDON, ENGLAND.

APPARATUS FOR SUPPLYING FUEL TO INTERNAL-COMBUSTION ENGINES.

1,362,211.  Specification of Letters Patent.  Patented Dec. 14, 1920.

Application filed August 12, 1919. Serial No. 317,055.

*To all whom it may concern:*

Be it known that I, ERNEST WINDSOR-BOWEN, a subject of the King of England, residing in Surrey, England, have invented certain new and useful Improvements in Apparatus for Supplying Fuel to Internal-Combustion Engines, of which the following is a specification.

This invention relates to the fuel supply of internal-combustion engines.

The solid injection of petrol and other liquid fuels into these engines has been heretofore suggested, but the body of liquid fuel to be injected per stroke in an engine is of such small bulk, even though the engine be a large one, that practical difficulties arise from the unavoidable absence of robustness and durability of the delicate and small size injection apparatus used, especially at high revolution-speeds. The supply of gasified petrol at a high pressure, and a correspondingly high temperature to the engine-cylinder has also been proposed, but this has also been found to be unsatisfactory in practice.

A primary object of the present invention is to obviate the above defects, and to provide for internal-combustion engines fuel-supply apparatus wherein the temperature and pressure of the liquid-fuel need not be raised more than a moderate degree at which it will not give rise to practical difficulties.

Another object of the invention is to provide fuel-supply apparatus of such size and robustness that the fuel can be controlled with precision satisfactorily and efficiently over long periods of running.

To these and other ends, the invention consists in the construction, arrangement and combination of parts described hereinafter and pointed out in the claims.

One embodiment of the invention and a modification thereof are diagrammatically illustrated by way of example in the accompanying drawings wherein:—

Like letters indicate like parts throughout the drawings.

Figs. 1 and 2 illustrate an apparatus as applied to the exhaust-valve cap of a cylinder of an internal-combustion engine, this form of apparatus being suitable for a single-cylinder engine although it may be applied to a multi-cylinder engine by providing a similar apparatus for each cylinder.

Figure 1:
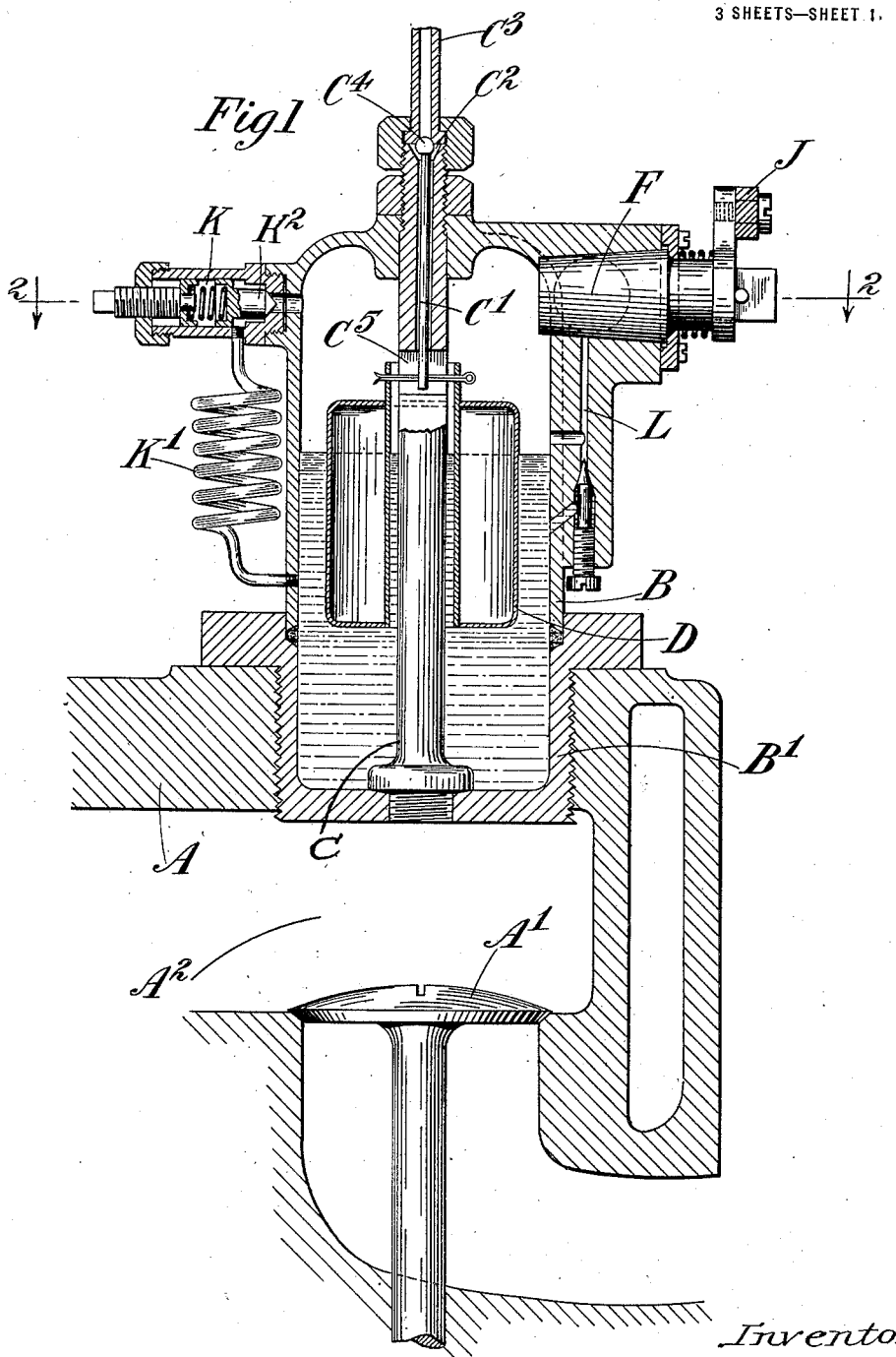
Figure 1 is a sectional elevation showing one form of fuel-supply apparatus according to the invention.

A indicates the exhaust-valve cap in which the exhaust-valve $A^1$ is shown.

A heating-chamber B may be formed in one piece or in two portions as shown, and has a screw-threaded portion $B^1$ engaging with a similarly threaded orifice in the valve-cap A. The portion $B^1$ extends through the valve-cap so that its base is situated in the combustion space $A^2$ of the engine. If desired, the heating chamber may be mounted on the exhaust pipe so as to be heated by the exhaust gases.

Screwed into the base of the part $B^1$ is a central guide C for a float D. The upper end of the guide C is tubular as at $C^1$ and is in connection at $C^2$ with a pipe $C^3$ leading from the fuel-supply tank. A ball-valve $C^4$ controlled by a spindle $C^1$ forming part of or operated by the float D controls the admission of liquid fuel through the pipe $C^3$ into the chamber B, $B^1$, the fuel flowing through the tubular portion $C^1$ and entering the chamber B, $B^1$ through orifices $C^5$.

In a duct E leading from the upper end of the heater B is a gas-throttle valve F, which controls the passage of vapor from the heater through the duct E to a pipe or mixing-chamber G communicating with the engine-cylinder.

A branch pipe H for the admission of air is controlled by means of an air-throttle $H^1$ and a suitable link or other connection diagrammatically illustrated at J is provided so that movement of the two valves F and H is effected simultaneously and in a predetermined relationship.

Connected also with the upper end of the heater B is a relief-valve generally denoted by the reference letter K controlling the expelled vapor from the heater B, and admitting such expelled vapor into a condensing coil $K^1$ opening into the casing of the valve K. The other end of the condenser $K^1$ enters the heater B as shown.

A pilot-jet L is provided for the admission of petrol from the heater B to the duct E for the starting of the engine, and when the pilot-jet is employed, air is admitted through a non-return valve (not shown) secured to a boss $E^1$ on the duct E and opening into the duct.

Thus in operation in starting up the engine, the throttle F is so operated as to close the passage between the chamber B and the duct E, but to admit into the duct E and pipe G fuel through the pilot-jet L, and air through the non-return valve above described. When, however, the engine is running, and sufficient heat has been generated to cause vaporization to occur in the chamber B, the throttle F, and with it the throttle $H^1$ is operated to open the chamber B to the duct E, whereafter the vapor passes from the chamber into the pipe or mixing-chamber G, and there meets with the air entering through the throttle $H^1$. If over generation of vapor occurs in the chamber B, the vapor therein rises to a pressure which forces the liquid upward in the condenser until the weight of the column of liquid thus formed balances the said pressure, which pressure then forces back the movable valve member $K^2$ from its seating.

If the capacity of the condenser above the level of liquid therein is not sufficient to permit the existence of these conditions, until liquid rises in the condenser until sufficient pressure is being exerted upon both the seated end of the valve member $K^2$ and upon the annular face of its rear piston-like end (by means of the condenser) to remove same from its seating.

Immediately the valve $K^2$ moves from its seating the liquid in the condenser is subjected to equal top and bottom pressures and, by force of gravity, falls to the same level as the liquid in the heater, vapor takes the place of the liquid in the condenser and is condensed. This condensation is continued until the pressure in the fuel heater is not sufficient to overcome the action of the spring behind the valve member, whereupon this member immediately advances to its seating.

Figure 2:
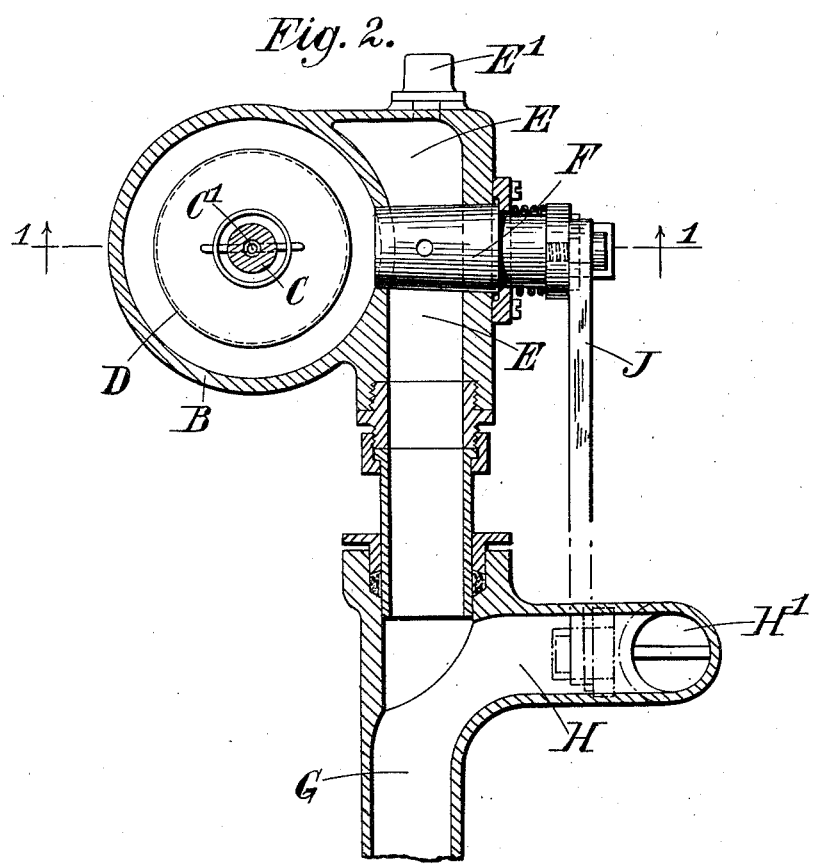
Fig. 2 is a part section on the line 2—2 of Fig. 1.
Figure 3:
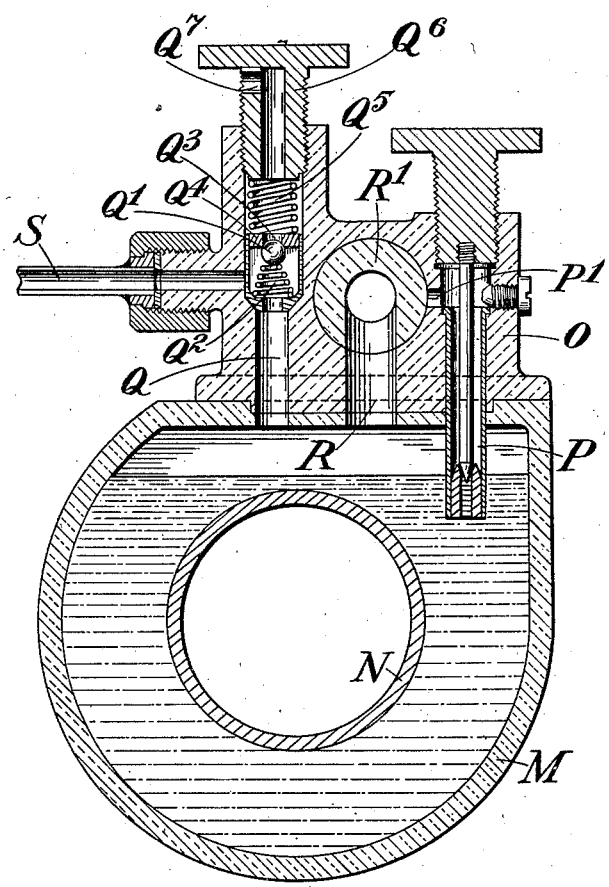
Fig. 3 is a section, similar to that of Fig. 1, of a modified form of apparatus.

In Fig. 3, the apparatus comprises a heater, the casing of which is shown at M and forms a closed chamber surrounding the engine exhaust pipe N. Secured to the upper side of the casing M is a casting O in which is a pilot-jet P, an air-inlet duct Q and a vapor outlet R. The latter is controlled by a throttle-valve $R^1$, and this valve is operatively connected to an air-throttle valve in a similar manner to the connection between these two valves described in the apparatus shown in Figs. 1 and 2.

Above the duct Q is a ball-valve $Q^1$ held by a spring $Q^2$ normally to close a port $Q^3$ in a slide or hollow piston $Q^4$. The latter is held in its downward position by a spring $Q^5$, the tension of which may be regulated by the member $Q^6$ screwing into a boss on the casting O. The member $Q^6$ has in it a duct $Q^7$ for admitting air to the ball-valve $Q^1$. The pipe S communicates with the duct Q, the communication between them being controlled by movement of the piston $Q^4$, and leads to a relief-valve and condensing-coil in a similar manner to the valve K and the coil $K^1$ as shown in Fig. 1.

Owing to the provision of this air-inlet valve in addition to the air-throttle valve referred to above, air can be admitted by suction to the heater and be supplied with vapor to the engine even if the air-throttle valve is closed, as may be convenient when starting.

The pilot-valve P is arranged to be placed in communication with the suction of the engine when starting the same. This communication is made by turning the throttle until its conduit is opposite a small conduit $P^1$, leading from the pilot-valve to the seating of the said throttle. This movement of the throttle closes the vapor outlet of the heater so that the engine in being started draws almost solid fuel.

Fuel is fed to the heater from the usual float feed device by means of a conduit (not shown on drawing) leading from the said device to the heater and situated below the normal level of liquid common to both the said device and the heater.

The operation of the apparatus illustrated in Fig. 3 is similar to that of the apparatus illustrated in Figs. 1 and 2, but in this case the one apparatus may be employed for supplying the vaporized-fuel to the several cylinders of a multi-cylinder engine. Moreover, by the apparatus illustrated in Fig. 3 a more regular heating takes place, the heat being contributed from the exhaust of each cylinder.

With either type of apparatus described the fuel-vapor or gas may be supplied to the mixing-chamber or engine-inlet either continuously or intermittently. In the latter case a mechanically controlled distribution-valve of any convenient form, preferably a rotary-valve, would be provided to admit the gas to each cylinder at the required moment and for the required period of time, at the end of or during the suction stroke or at the beginning of the compression stroke of the engine. This insures economy of gas and eliminates losses due to blow-back.

What I claim as my invention and desire to secure by Letters Patent is:—

1. In an apparatus for supplying vaporized fuel to an internal-combustion engine, the combination with a liquid-fuel heater arranged to be heated by the gaseous products of combustion of the engine, and an induction pipe opening into the heater, of a condenser in the form of an air-cooled tubular conduit having one end in direct open communication with a lower part of the heater, and a pressure-relief valve controlling the connection of the other end with the upper part of the heater, for the purpose specified.

2. The combination with an internal combustion engine, of a liquid-fuel heater mounted directly on a part thereof heated directly by the fuel burnt therein, an induction pipe opening into the heater, a condenser in the form of an air-cooled spiral tubular conduit having one end opening directly into the heater at a point located below the normal level of the liquid fuel therein, and a pressure-relief valve controlling the connection of the other end with the upper part of the heater, for the purpose specified.

3. In an apparatus for supplying vaporized fuel to an internal-combustion engine, the combination with a liquid-fuel heater, of a pressure-relief valve for the heater, a condenser connected with the said valve, a delivery conduit, having a valve for controlling the same, connected to the said heater, an air-inlet duct, having a valve for controlling the same, leading to the said delivery conduit, and means operatively connecting the said valves to control the same in unison.

In testimony whereof I affix my signature.

ERNEST WINDSOR-BOWEN